(12) United States Patent
Platt et al.

(10) Patent No.: US 8,200,601 B2
(45) Date of Patent: Jun. 12, 2012

(54) BOOSTING TO DETERMINE INDICATIVE FEATURES FROM A TRAINING SET

(75) Inventors: John Platt, Bellevue, WA (US); Harvey Rook, Newcastle, WA (US); Shengquan Yan, Bellevue, WA (US); Rajasi Saha, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 579 days.

(21) Appl. No.: 12/471,841

(22) Filed: May 26, 2009

(65) Prior Publication Data

US 2010/0306147 A1    Dec. 2, 2010

(51) Int. Cl.
*G06F 17/00* (2006.01)
*G06N 5/02* (2006.01)

(52) U.S. Cl. .................................................. 706/46
(58) Field of Classification Search .............. 706/46
See application file for complete search history.

(56) References Cited

U.S. PATENT DOCUMENTS

| | | | |
|---|---|---|---|
| 7,024,033 B2 | 4/2006 | Li et al. ................... | 382/159 |
| 7,277,574 B2 | 10/2007 | Liu et al. .................. | 382/159 |
| 7,693,865 B2 * | 4/2010 | Lu et al. ................... | 707/771 |
| 2006/0069678 A1 | 3/2006 | Chou et al. ............... | 707/5 |
| 2009/0024607 A1 | 1/2009 | Sun et al. ................. | 707/5 |
| 2009/0070415 A1 | 3/2009 | Kishi et al. .............. | 709/203 |

OTHER PUBLICATIONS

Feature region-merging based fuzzy rules extraction for pattern classification, Hongwei Zhu; Basir, O.; Fuzzy Systems, 2003. FUZZ '03. The 12th IEEE International Conference on vol. 1 Digital Object Identifier: 10.1109/FUZZ.2003.1209448 Publication Year: 2003, pp. 696-701 vol. 1.*
Graph-Based Feature Selection for Object-Oriented Classification in VHR Airborne Imagery, Xi Chen; Tao Fang; Hong Huo; Deren Li; Geoscience and Remote Sensing, IEEE Transactions on vol. 49, Issue: 1, Part: 2 Digital Object Identifier: 10.1109/TGRS.2010.2054832 Publication Year: 2011, pp. 353-365.*
Union of incoherent spaces model for classification, Schnass, K.; Vandergheynst, P.; Acoustics Speech and Signal Processing (ICASSP), 2010 IEEE International Conference on Digital Object Identifier: 10.1109/ICASSP.2010.5495208 Publication Year: 2010, pp. 5490-5493.*
AdaBoost from Wikipedia, http://en.wikipedia.org/wiki/AdaBoost, 3 pgs., Mar. 30, 2009.
Yiming Yang et al., "A Comparative Study on Feature Selection in Text Categorization", 9 pgs., Mar. 30, 2009, https://eprints.kfupm.edu.sa/39470/1/39470.pdf.
Robert E. Schapire, "The Strength of Weak Learnability", Machine Learning, 5, pp. 197-227, 1990 http://www.connex.lip6.fr~amini/RelatedWorks/schapire_swl.pdf.
Stan Z. Li et al., "FloatBoost Learning for Classification," 8 pgs., Mar. 30, 2009, http://books.nips.cc/papers/files/nips15/AA65.pdf.

(Continued)

*Primary Examiner* — Michael B Holmes
(74) *Attorney, Agent, or Firm* — Merchant & Gould

(57) ABSTRACT

Determining indicative features may be provided. First, a first set of features may be determined using a document frequency process. Then a second set of features may be determined using a boosting process. Using the boosting process may comprise using an approximation for a one-dimensional optimization. The approximation may include an upper bound. Next, the first set of features and the second set of features may be combined into a combined set of features. The combined set of features may comprise a union of the first set of features and the second set of features. At least one document may then be classified based on the combined set of features.

20 Claims, 3 Drawing Sheets

OTHER PUBLICATIONS

Stan Z. Li et al., "FloatBoost Learning and Statistical Face Detection", IEEE Transactions on Pattern Analysis and Machine Intelligence, vol. 26, No. 9, Sep. 2004, pp. 1112-1123, http://ieeexptore.ieee.org.stamp/stamp.jsp?arnumber=01316847.

* cited by examiner

BOOSTING TO DETERMINE INDICATIVE FEATURES FROM A TRAINING SET

BACKGROUND

Document classification is an information science problem. In document classification, the object is to assign an electronic document, based on the electronic document's contents, to one or more categories. Document classification has been divided into two types, supervised document classification and unsupervised document classification. In supervised document classification, some external mechanism (e.g., human feedback) provides information on the correct classification for the document. In unsupervised document classification, the classification is done entirely without reference to external information.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

First, a first set of features may be determined using a document frequency process. Then a second set of features may be determined using a boosting process. Using the boosting process may comprise using an approximation for a one-dimensional optimization. The approximation may include an upper bound. Next, the first set of features and the second set of features may be combined into a combined set of features. The combined set of features may comprise a union of the first set of features and the second set of features. At least one document may then be classified based on the combined set of features.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
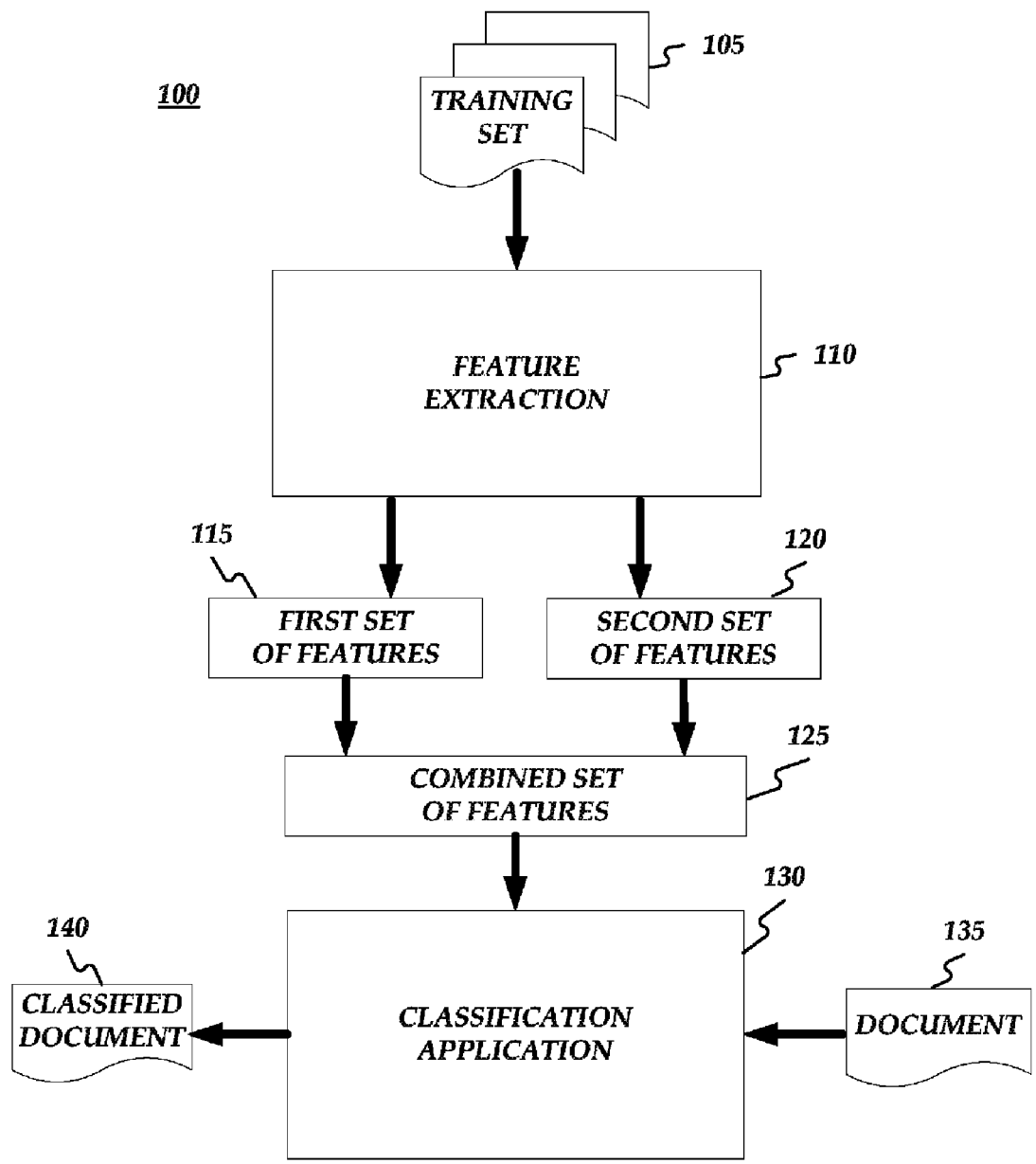
FIG. 1 is a block diagram of a features system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

When using machine learning to predict a certain result, after a training set is picked, features may be selected such that they can provide a high degree of information about the certain result. When the proportion of different types of documents within the certain result set varies greatly, picking features merely with the highest document frequency may not be sufficient, as this may leave out those features that appear in a smaller number of documents, but still hold indicative information of non-dominant patterns.

Consistent with embodiments of the present invention, it may be determined how strongly correlated a feature is to any result and use that information to pick features. A feature may be strongly correlated to a result if it appears more often in that result than in other results. Such a feature is a good candidate for selection. If the feature appears equally frequently in all results, then the correlation of that feature with the results may be weak and it may not be picked.

A boosting process, consistent with embodiments of the invention, may be used to find correlation between features and results. The results of the boosting process may then be combined with features obtained purely based on document frequency to provide a combined feature set. Embodiments of the invention may include a boosting process described below in greater detail. Also, embodiments of the invention may include combining features obtained using document frequency (e.g., a first set of features) with features selected by the boosting process (e.g., a second set of features) to get the combined feature set. The combined feature set may comprise a better feature set than either of the first set of features or the second set of features alone.

FIG. 1 is a block diagram of a features system 100. As shown in FIG. 1, system 100 may include a feature extraction 110 and a classification application 130 (e.g., classification module). Feature extraction 110 may receive a training set 105 and produce, based on training set 105, a first set of features 115 and a second set of features 120. First set of features 115 and second set of features 120 may be combined into a combined set of features 125. Classification application 130 may receive a document 135 and use combined set of features 125 to classify document 135 as a classified document 140. In other embodiments of the invention, first set of features 115 may be received from another source other than feature extraction 110.

While not so limited, embodiments of the invention may categorize documents comprising e-mail on a per-user basis. Consistent with embodiments of the invention any document may be categorized and embodiments of the invention are not limited to e-mail. Furthermore, embodiments of the invention are not limited to document classification and may include systems and processes for creating indicative features from a training set.

Figure 2:
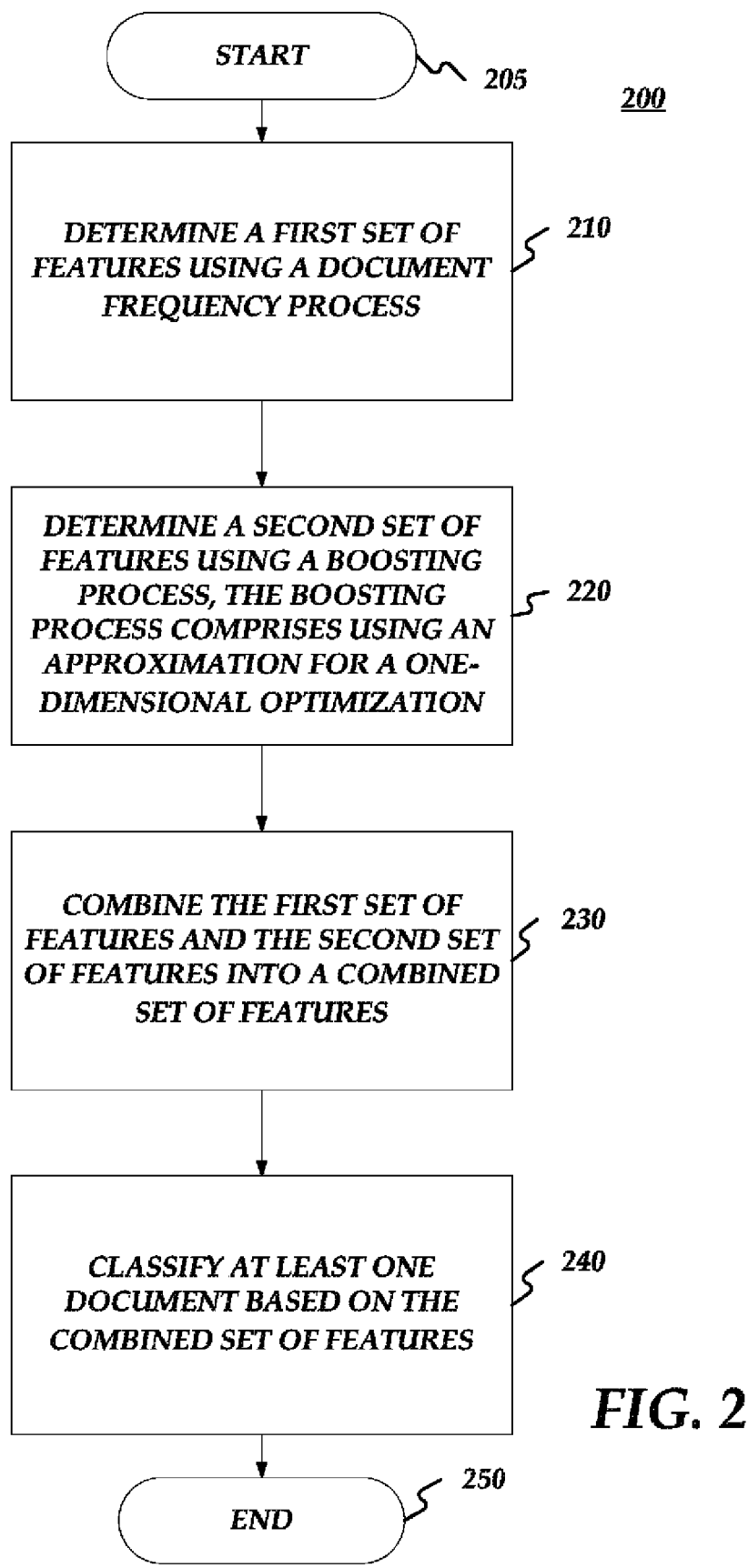
FIG. 2 is a flow chart of a method for determining indicative features.

Consistent with embodiments of the present invention, FIG. 2 is a flow chart setting forth the general stages involved in a method 200 consistent with embodiments of the invention for determining indicative features. Method 200 may be implemented using a computing device 300 as described in more detail below with respect to FIG. 3. Ways to implement the stages of method 200 will be described in greater detail below.

Method 200 may begin at starting block 205 and proceed to stage 210 where computing device 300 may determine first set of features 115 using a document frequency process. For example, a set of tagged e-mail documents may be used as training set 105. From training set 105, features may be picked for training. The tagged e-mail documents may comprise, for example: i) e-mails tagged as junk e-mail or not junk e-mail; ii) e-mails tagged as "news" or not news; and ii) e-mails tagged as being e-mail that should be retained for a specific time period. The aforementioned tags are examples, and other tags may be used.

Features, for example, may comprise single words that occur in e-mail headers and body in training set 105. Features are not limited to single words, however, and may comprise any document attribute such as word phrases, any combination of characters, time or date an e-mail was sent, length of a document, or absence of any document attribute. Consistent with embodiments of the invention, first set of features 115 may be selected based on document frequency, for example, how frequently a feature appears across training set 105. Weighted features may then be placed in first set of features 115 and used to predict a tag (e.g., classification) for new incoming e-mail as described below with respect to stage 240.

From stage 210, where computing device 300 determines first set of features 115, method 200 may advance to stage 220 where computing device 300 may determine second set of features 120 using, for example, a boosting process. Using the boosting process may comprise using an approximation for a one-dimensional optimization. The approximation may include an upper bound.

The boosting process may be used because, for example, features that appear in relatively few e-mails in training set 105 may not get picked up if features are selected purely based on document frequency (i.e., the aforementioned frequency process). This may be because the features in dominant patterns may have large document frequencies that may overwhelm features in relative few e-mails in training set 105. With the boosting process, these low document frequency features may be more likely to be selected if their appearance is correlated with patterns identifying a category (e.g., a tag), for example, they only appear in e-mails that are tagged in one category, but not in another category.

Consistent with embodiments of the invention, the boosting process may start with an empty feature set. Then the boosting process may iteratively select one feature at a time that may best differentiate the categories (e.g., tags) when combined with existing features (i.e., features already selected into second set of features 120). The iteration may continue until the performance improvement is less than a specified criterion. This approach may give a better probability to capture the most indicative features, even though their document frequency may be low.

An example of the boosting process will now be described in more detail. First, the boosting process may maintain a $z_n$ score, one for each example in training set 105. Initially, this may be set to zero. Next, in a first stage in the boosting process, for each possible additional feature into second set of features 120, the following may be computed:

$$S_\eta = \frac{1}{1 + \exp(z_n y_n)}$$

$S_n$ may comprise the current strength of the example n, which may comprise the probability that the boosting process may assign to the incorrect label. So, the more correct the boosting process is on an example, the less weight that it may give to an example.

Then, for a second stage in the boosting process, for each possible feature to be considered:

For each value c of the feature (for example, either 0 or 1):

$$A_c = \sum_{n \in C} y_n s_n$$

$$\left( \text{take the sum over all examples where the feature attains value } c \right)$$

$$B_c = \sum_{n \in C} (1 - 2s_n)/(y_n z_n)$$

$$\eta_c = \frac{2A_c}{B_c}$$

(this may be the optimal step size of the bound).

Compare all considered features according to their improvement on the bound. Choose the feature that yields the best improvement:

$$\text{improvement} = \sum_c \frac{A_c^2}{B_c}$$

Update $z_n$ for all examples, by $$z_n \leftarrow z_n + \eta_c h_{nc}$$

Where $h_{nc}$ is 1 if picked feature attains value c on example n. In other words, update the $z_n$ values by the step that corresponds to its feature value.

If feature f was picked, then update the weight and the bias.

$$w_f \leftarrow w_f + \eta_1 - \eta_0$$

$$b \leftarrow b + \eta_0$$

Consistent with embodiments of the invention, the aforementioned first stage and the aforementioned second stage of the boosting process may be iterated until a predetermined stopping criterion is reached. For example, the stopping criterion may be when the improvement (e.g., bound) is less than 1.0. Consistent with embodiments of the invention, other stopping criterion may be used. Once the boosting processes converges according to the stopping criterion. The features with non-zero weights may be extracted to comprise the second feature set of 120.

In the boosting process, at every found, a 1D optimization may be performed to find the strength of how much a new weak learner (e.g., feature) contributes to the ensemble (e.g., second set of features 120). To exactly solve this optimization, an iterative algorithm may be used. Instead of using this iterative algorithm, and consistent with embodiments of the invention, a variational process to approximate the 1D optimization with an upper bound that is solvable exactly may be used as described above. Consequently, embodiments of the invention may allow for scanning weak learners (e.g., features) more quickly/accurately to find better weak learners. Compared to the iterative algorithm, the variational process to approximate the 1D optimization with the upper bound may be more easily coded and implemented in software for example.

Once computing device 300 determines second set of features 120 in stage 220, method 200 may continue to stage 230 where computing device 300 may combine first set of features 115 and second set of features 120 into combined set of features 125. Combined set of features 125 may comprise a union of first set of features 115 and second set of features 120. For example, the aforementioned boosting process may be aggressive because it may try to select as few features as possible to differentiate the categories. Consequently, using the boosting process alone to predict features may not improve the general performance. Accordingly, consistent with embodiments of the invention first set of features 115 (from the aforementioned frequency process) and second set of features 120 (from the aforementioned boosting process) may be combined into a combined set of features 125. Using combined set of features 125 may achieve better prediction in general than using either of first set of features 115 or second set of features 120 alone.

After computing device 300 combines first set of features 115 and second set of features 120 in stage 230, method 200 may proceed to stage 240 where computing device 300 may classify at least one document (e.g., document 135) based on combined set of features 125. For example, combined set of features 125 may be used to determine what classification to tag document 135 with. Document 135 may be tagged as comprising junk e-mail or not junk e-mail, may be tagged as containing a specific news topic, or may be tagged as being e-mail that should be retained for a specific time period. The aforementioned tags are examples, and other tags may be used. Using combined set of features 125 may achieve better prediction in general than using either of first set of features 115 or second set of features 120 alone.

Computing device 300 may do the classifying or computing device 300 may transmit combined set of features 125 to one of other computing devices 318 that may do the classifying. Consequently, one of other computing devices 318 may have and may execute an application (e.g., a classification module) similar to classification 130 in order to perform the classification. Once the at least one document is classified in stage 240, method 200 may then end at stage 250.

An embodiment consistent with the invention may comprise a system for determining indicative features. The system may comprise a memory storage and a processing unit coupled to the memory storage. The processing unit may be operative to determine a first set of features using a document frequency process and to determine a second set of features using a boosting process. Using the boosting process may comprise using an approximation for a one-dimensional optimization. The approximation may include an upper bound. In addition, the processing unit may be operative to combine the first set of features and the second set of features into a combined set of features. The combined set of features may comprise a union of the first set of features and the second set of features. Furthermore, the processing unit may be operative to classify at least one document based on the combined set of features.

Another embodiment consistent with the invention may comprise a system for determining indicative features. The system may comprise a memory storage and a processing unit coupled to the memory storage. The processing unit may be operative to determine a first set of features using a document frequency process and to determine a second set of features using a boosting process. Using the boosting process may comprise using an approximation for a one-dimensional optimization. The approximation may include an upper bound. In addition, the processing unit may be operative to combine the first set of features and the second set of features into a combined set of features. The combined set of features may comprise a union of the first set of features and the second set of features. Furthermore, the processing unit may be operative to transmit the combined set of features to a classifying module.

Figure 3:
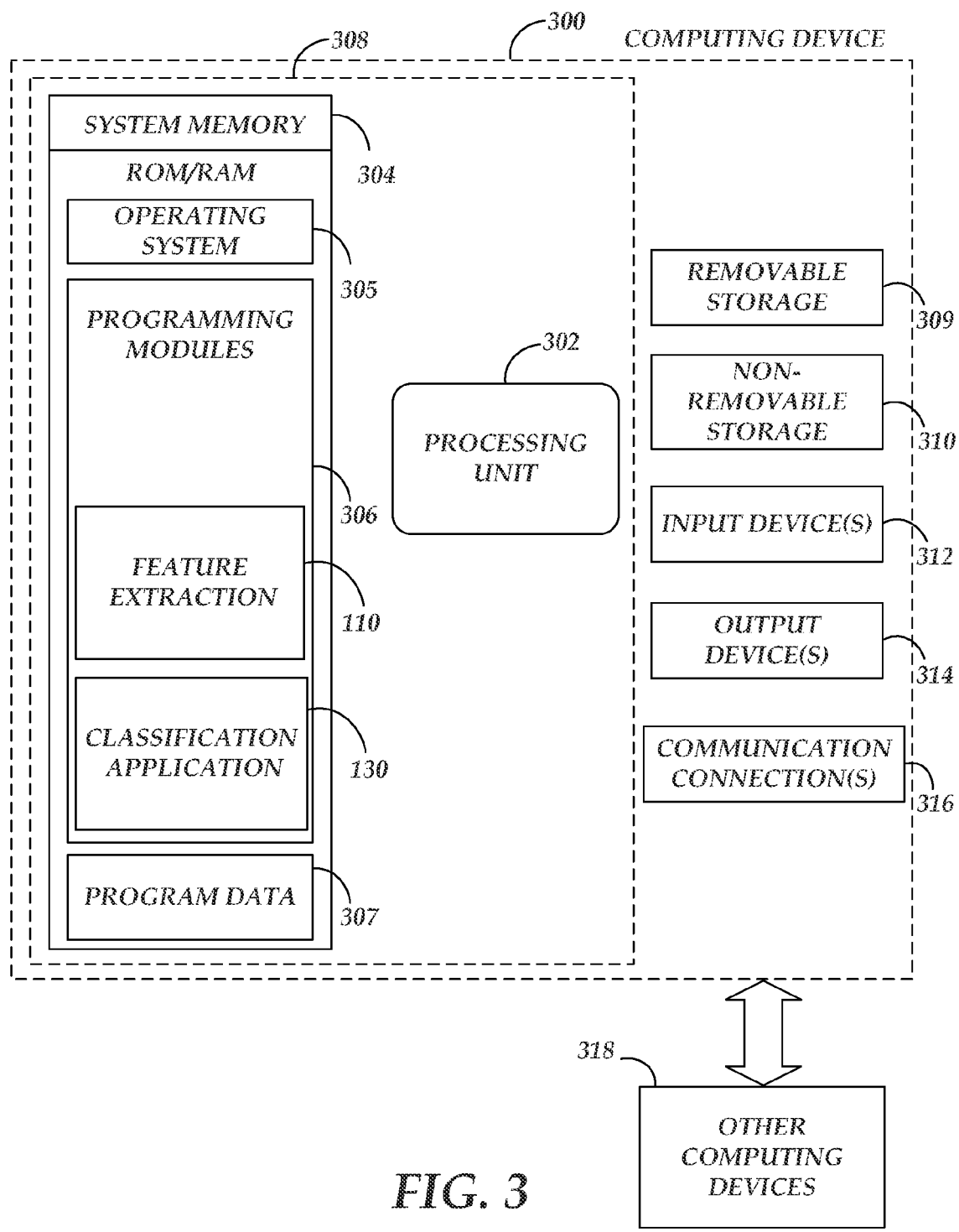
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g., random access memory (RAM)), non-volatile (e.g., read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include, for example, a feature extraction 110 and a classification application 130 (e.g., a classification module). Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g., feature extraction 110 or classification application 130) may perform processes including, for example, one or more method 200's stages as described above. In addition, an application similar in functionality to classification application 130 (e.g., classification module) may be executed on one of other computing devices 318. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for determining indicative features, the method comprising:
   determining a first set of features using a document frequency process;
   determining a second set of features using a boosting process;
   combining the first set of features and the second set of features into a combined set of features, the combined set of features comprising a union of the first set of features and the second set of features; and
   classifying at least one document based on the combined set of features.

2. The method of claim 1, wherein using the boosting process comprises using an approximation for a one-dimensional optimization, the approximation including an upper bound, wherein using the boosting process comprises:
   maintaining a $z_n$ score for each example n in a training set, each $z_n$ score being initiated at zero;
   (a) computing $$s_n = \frac{1}{1 + \exp(s_n y_n)}$$

for each possible additional feature into the second set of features, $s_n$ comprising the current strength of each example n;
   (b) for the each possible additional feature, computing, $$A_c = \sum_{n \in C} y_n s_n$$
   $$B_c = \sum_{n \in C} (1 - 2s_n)/(y_n z_n)$$
   $$\eta_c = \frac{2A_c}{B_c}$$

comparing, for each possible additional feature into the second set of features, their improvement on the upper bound wherein the improvement comprises, $$\sum_c \frac{A_c^2}{B_c}$$

updating $z_n$ for each example n in a training set, and updating a weight vector for the second set of features; and
   repeating (a) and (b) until a predetermined improvement value is attained.

3. The method of claim 2, wherein repeating (a) and (b) until the predetermined improvement value is attained comprises repeating (a) and (b) until the predetermined improvement value is attained, wherein the predetermined improvement value is less than 1.

4. The method of claim 1, wherein determining the first set of features using the document frequency process comprises determining how frequently a feature appears across a training set of documents.

5. The method of claim 1, wherein determining the first set of features comprises determining the first set of features comprising words.

6. The method of claim 1, wherein determining the first set of features comprises determining the first set of features comprising any attribute a document may have.

7. The method of claim 1, wherein determining the second set of features comprising using a training set of documents.

8. The method of claim 1, wherein determining the second set of features comprises determining the second set of features comprising words.

9. The method of claim 1, wherein determining the second set of features comprises determining the second set of features comprising any attribute a document may have.

10. The method of claim 1, wherein:
    determining the first set of features using the document frequency process comprises determining how frequently a feature appears across a training set of documents; and
    determining the second set of features comprising using the training set of documents to determine the second set of features.

11. The method of claim 1, wherein classifying the at least one document comprises classifying the at least one document as a junk e-mail document.

12. The method of claim 1, wherein classifying the at least one document comprises classifying the at least one document as a news document.

13. The method of claim 1, wherein classifying the at least one document comprises classifying the at least one document as a document that should be retained for a specific time period.

14. A computer-readable medium that stores a set of instructions which when executed perform a method for determining indicative features, the method executed by the set of instructions comprising:
    determining a second set of features using a boosting process, wherein using the boosting process comprises using an approximation for a one-dimensional optimization, the approximation including an upper bound, wherein using the boosting process comprises:
    maintaining a $z_n$ score for each example n in a training set, each $z_n$ score being initiated at zero;
    (a) computing $$s_n = \frac{1}{1 + \exp(z_n y_n)}$$

for each possible additional feature into the second set of features, $s_n$ comprising the current strength of each example n;
    (b) for the each possible additional feature, computing, $$A_c = \sum_{n \in C} y_n s_n$$
    $$B_c = \sum_{n \in C} (1 - 2s_n)/(y_n z_n)$$
    $$\eta_c = \frac{2A_c}{B_c}$$

comparing, for each possible additional feature into the second set of features, their improvement on the upper bound wherein the improvement comprises, $$\sum_c \frac{A_c^2}{B_c}$$

updating $z_n$ for each example n in a training set, and updating a weight vector for the second set of features; and repeating (a) and (b) until a predetermined improvement value is attained;

combining a first set of features and the second set of features into a combined set of features, the combined set of features comprising a union of the first set of features and the second set of features; and transmitting the combined set of features to a classifying module.

15. The computer-readable medium of claim 14, further comprising determining the first set of features using a document frequency process.

16. The computer-readable medium of claim 15, wherein:

determining the first set of features using the document frequency process comprises determining how frequently a feature appears across the training set of documents; and determining the second set of features comprising using the training set of documents to determine the second set of features.

17. The computer-readable medium of claim 14, wherein transmitting the combined set of features to the classifying module comprises transmitting the combined set of features to the classifying module configured to classify at least one document based on the combined set of features.

18. The computer-readable medium of claim 14, wherein repeating (a) and (b) until the predetermined improvement value is attained comprises repeating (a) and (b) until the predetermined improvement value is attained, wherein the predetermined improvement value is less than 1.

19. A system for determining indicative features, the system comprising:

a memory storage; and a processing unit coupled to the memory storage, wherein the processing unit is operative to:

determine a first set of features using a document frequency process;

determine a second set of features using a boosting process, wherein using the boosting process comprises using an approximation for a one-dimensional optimization, the approximation including an upper bound;

combine the first set of features and the second set of features into a combined set of features, the combined set of features comprising a union of the first set of features and the second set of features; and transmit the combined set of features to a classifying module.

20. The system of claim 19, wherein:

the processing unit being operative to determine the first set of features using the document frequency process comprises the processing unit being operative to determine how frequently a feature appears across a training set of documents; and the processing unit being operative to determine the second set of features comprising the processing unit being operative to use the training set of documents to determine the second set of features.

* * * * *